US008890808B2

(12) United States Patent
Nan et al.

(10) Patent No.: US 8,890,808 B2
(45) Date of Patent: Nov. 18, 2014

(54) REPOSITIONING GESTURES FOR CHROMELESS REGIONS

(75) Inventors: Jennifer Nan, Seattle, WA (US); Jesse Clay Satterfield, Seattle, WA (US); Daryl Tanghe, Seattle, WA (US); Chaitanya D. Sareen, Seattle, WA (US); Michael Seibert, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 13/345,263

(22) Filed: Jan. 6, 2012

(65) Prior Publication Data
US 2013/0176212 A1    Jul. 11, 2013

(51) Int. Cl.
*G06F 3/033* (2013.01)
(52) U.S. Cl.
USPC .......................... 345/157; 345/156; 345/174
(58) Field of Classification Search
CPC ..... G06F 3/033; G06F 3/0481; G06F 3/0486; G06F 3/04883
USPC .......... 345/157, 156, 173, 174; 715/810, 781, 715/720, 863, 711
See application file for complete search history.

(56) References Cited

U.S. PATENT DOCUMENTS

| 5,406,307 | A  | 4/1995  | Hirayama et al. |
|-----------|----|---------|-----------------|
| 5,603,053 | A  | 2/1997  | Gough et al. |
| 5,657,049 | A  | 8/1997  | Ludolph et al. |
| 6,346,935 | B1 | 2/2002  | Nakajima et al. |
| 7,251,782 | B1 | 7/2007  | Albers et al. |
| 7,304,638 | B2 | 12/2007 | Murphy |
| 7,689,916 | B1 | 3/2010  | Goel et al. |
| 7,898,529 | B2 | 3/2011  | Fitzmaurice et al. |
| 8,134,727 | B1 | 3/2012  | Shmunis et al. |
| 8,171,431 | B2 * | 5/2012 | Grossman et al. ............ 715/863 |
| 8,245,156 | B2 | 8/2012  | Mouilkseaux et al. |
| 8,334,871 | B2 | 12/2012 | Hamilton, II et al. |
| 2002/0105553 | A1 | 8/2002 | Segre |
| 2003/0107604 | A1 | 6/2003 | Ording |
| 2004/0212617 | A1 | 10/2004 | Fitzmaurice et al. |
| 2005/0091612 | A1 | 4/2005 | Stabb et al. |

(Continued)

OTHER PUBLICATIONS

"What You Should Expect from the Windows 7 Beta"—Retrieved Date: Nov. 23, 2011, http://www.howtogeek.com/howto/the-geek-blog/what-you-should-expect-from-the-windows-7-beta/.

(Continued)

*Primary Examiner* — Thuy Pardo
(74) *Attorney, Agent, or Firm* — Bryan Webster; Kate Drakos; Micky Minhas

(57) ABSTRACT

In graphical computing environments, applications are often presented as windows and other regions with visual controls that enable standardized region management functions, including repositioning the regions. However, in some scenarios (particularly devices with small displays), such user interface "chrome" may undesirable diminish the size of the region devoted to the output of the application, and removing such visual controls without eliminating repositioning functionality may be advantageous. Presented herein are repositioning gestures that may be invoked to request repositioning of a selected region by "hovering" a pointer near an edge of the display that is near the selected region; optionally by activating the pointer; and by moving the pointer away from the edge of the display (e.g., "dragging" the pointer while depressing a mouse button). This gesture may easily and unambiguously invoke a region repositioning mode for the selected region, despite the absence of visual repositioning controls confluent with the region.

20 Claims, 7 Drawing Sheets

(56) References Cited

U.S. PATENT DOCUMENTS

| | | | |
|---|---|---|---|
| 2005/0114778 | A1 | 5/2005 | Branson et al. |
| 2005/0125739 | A1 | 6/2005 | Thompson et al. |
| 2006/0055670 | A1* | 3/2006 | Castrucci ..................... 345/157 |
| 2006/0156247 | A1 | 7/2006 | McCormack et al. |
| 2007/0067798 | A1 | 3/2007 | Wroblewski |
| 2007/0180381 | A1 | 8/2007 | Rice et al. |
| 2007/0266342 | A1* | 11/2007 | Chang et al. .................. 715/810 |
| 2007/0291007 | A1 | 12/2007 | Forlines et al. |
| 2008/0052637 | A1 | 2/2008 | Ben-Yoseph |
| 2008/0313538 | A1 | 12/2008 | Hudson |
| 2009/0094560 | A1* | 4/2009 | Grossman et al. ............. 715/863 |
| 2009/0174679 | A1 | 7/2009 | Westerman |
| 2009/0183077 | A1* | 7/2009 | Hakim et al. .................. 715/720 |
| 2009/0315741 | A1* | 12/2009 | Kim ................................ 341/23 |
| 2010/0057566 | A1 | 3/2010 | Itzhak |
| 2010/0106607 | A1 | 4/2010 | Riddiford et al. |
| 2010/0157157 | A1 | 6/2010 | Yi |
| 2010/0192102 | A1 | 7/2010 | Chmielewski et al. |
| 2011/0138313 | A1 | 6/2011 | Docker et al. |
| 2011/0279461 | A1 | 11/2011 | Hamilton, II et al. |
| 2011/0320978 | A1 | 12/2011 | Horodezky et al. |
| 2012/0079414 | A1* | 3/2012 | Eischeid et al. .............. 715/781 |
| 2012/0161791 | A1 | 6/2012 | Shaw |
| 2012/0180001 | A1 | 7/2012 | Griffin et al. |
| 2012/0254808 | A1* | 10/2012 | Gildfind ......................... 715/863 |
| 2012/0272181 | A1 | 10/2012 | Rogers et al. |

OTHER PUBLICATIONS

"Working with Windows"—Retrieved Date: Nov. 23, 2011, http://h30097.www3.hp.com/docs/base_doc/DOCUMENTATION/V40F_HTML/AQ917BTE/DOCU_004.HTM.

"Shottrack for Windows VoD Software and Analysis"—Retrieved Date: Nov. 23, 2011, http://www.matrixconsult.com.au/MATRIX_Web_Files/ShotTrack_Software_Manual.pdf.

"Window Desktop"—Retrieved Date: Nov. 23, 2011, http://pjnicholson.com/windowsdesktop.htm.

"KDE 4.0 Visual Guide: Desktop"—Retrieved Date: Nov. 23, 2011, http://kde.org/announcements/4.0/desktop.php.

Non-Final Office Action cited in U.S. Appl. No. 13/345,383 dated Feb. 28, 2013, 30 pgs.

Reply Non-Final Office Action cited in U.S. Appl. No. 13/345,383 dated May 28, 2013, 19 pgs.

Final Office Action cited in U.S. Appl. No. 13/345,383 dated Jul. 30, 2013, 32 pgs.

Reply Final Office Action cited in U.S. Appl. No. 13/345,383 dated Oct. 30, 2013, 18 pgs.

Microsoft Windows, The Start Menu (overview), Dec. 19, 2010, www.windows.microsoft.com/en-US/windows-vista/The-Start-menu-overview, 3 pgs.

"Windows 8 Mouse and Keyboard Commands", Rudy Stebih, Sep. 21, 2011, http://www.helpdesktv.ca/windows/windows-8-mouse-and-keyboard-commands.html, 5 pgs.

"Win7se Brings Mac-Like Screen Corners to Windows 7 & Windows 8", Danish, Nov. 13, 2011, http://technomondo.com/2011/11/13/win7se-brings-mac-like-screen-corners-to-windows-7-windows-8, 4 pgs.

Dual-Surface Input: Augmenting One-Handed Interaction with Coordinated Front and Behind-the-Screen Input:, Xing-Dong Yang, Edward Mak, Rpurang Irani and Walter F. Bischof, Sep. 18, 2009, Proceedings: MobileHCI '09 Proceedings of the 11th International Conference on Human-Computer Interaction with Mobile Devices and Services, http://www.cs.ualberta.ca/~wfb/publications/C-2009-MobileHCI-YHang.pdf, 10 pgs.

Non-Final Office Action cited in U.S. Appl. No. 13/345,383 dated Feb. 14, 2014, 31 pgs.

Reply Non-Final Office Action cited in U.S. Appl. No. 13/345,383 dated Jun. 16, 2014, 18 pgs.

Final Office Action cited in U.S. Appl. No. 13/345,383 dated Jul. 25, 2014, 36 pgs.

* cited by examiner

REPOSITIONING GESTURES FOR CHROMELESS REGIONS

BACKGROUND

Within the field of computing, many scenarios involve the presentation of regions in a graphical environment, such as windows, icons, menu bars, toolbars, and widgets, as well as a background region, such as a desktop presented as a backdrop for the graphical environment. A user may manipulate a pointing device (e.g., a mouse, trackball, touchpad, drawing tablet, stylus, or touchscreen device) to manipulate a pointer within the graphical environment in order to select and interact with the regions. One such interaction involves the position of a region within the graphical environment, such as showing or hiding a region; moving the region to a new location; changing the size of the region in one or more dimensions; or toggling a region into a full-screen, maximized, non-maximized, docked, or hidden state.

In many such graphical environments, regions are presented confluent with one or more visual controls that, when manipulated with the pointer or other user input, enable various operations on the region. For example, buttons may be attached to the region to enable the region (and optionally an application associated with the region) to be suspended, resumed, or terminated, and a menu bar may be attached to the region (adjacent to or within the region) to enable the user to invoke various operations of the application associated with the region.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Although the presentation of visual controls associated with a region may enable various operations on the region and/or the associated application, such presentation may consume valuable space on the display of the device. In some scenarios, such consumption may be regarded as an inefficient use of display space that diminishes the amount of display space usable by the application. For example, if the application presents within the region a custom menu including a "Close" option, then presenting a "Close" visual control confluent with the region of the application (in a manner that is visible at all times) may incrementally reduce the size of the region while providing only redundant functionality. Moreover, such visual controls are often presented in a large non-interactive display element, such as a menu bar displayed along the entire top width of the region but presenting only one or two menu options. Therefore, it may be desirable to reduce the amount of "chrome" (e.g., attached visual controls and embedding visual elements) confluent with respective regions in order to maximize the use of the display space by the regions in furtherance of associated applications. However, it is still desirable to enable standardized operations for such regions and associated applications that were provided by the omitted visual controls, particularly including the capability of altering the position (including the location and size) of respective regions.

Presented herein are techniques for enabling a user to reposition regions presented on a display of a device, where such repositioning may be conveniently achieved in the absence of confluent visual controls that explicitly provide repositioning options. These techniques involve the configuration of the device to detect a particular type of pointer gesture that a user may learn to utilize to invoke a repositioning mode. This pointer gesture comprises "hovering" the pointer near an edge of the display near (e.g., adjacent to) a region for a brief duration, and then moving the pointer away from that edge. Depending on the input device manipulating the pointer, the movement away from the edge may comprise a "dragging" gesture, e.g., activating and holding a mouse button while moving the pointer away from the edge of the display. This gesture may cause the device to enter a region repositioning mode, e.g., where positions for the region on the display may be suggested, and where a suggested position may be selected by the user (e.g., by repositioning the pointer over a suggested position and releasing the held mouse button) to execute the repositioning of the region at the selected position.

The configuration of the device to detect such gestures as requests to reposition a region may present several advantages. As a first example, the edges of a display are often easily accessible to a user (according to some consequences of Fitts' Law), and a user may rapidly invoke such gestures, and possibly without regard to the current position of the pointer or even without looking at the display. As a second example, such gestures are not currently associated with any known functionality, and users may be easily and intuitively trained to utilize such gestures to request the repositioning of a region. As a third example, such gestures may be detectable with high accuracy, a low degree of ambiguity, and a comparatively simple analytic process (as contrasted with gestures that involve complex shape analysis, such as the drawing of symbols such as letters). These and other advantages may be achievable through the implementation of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
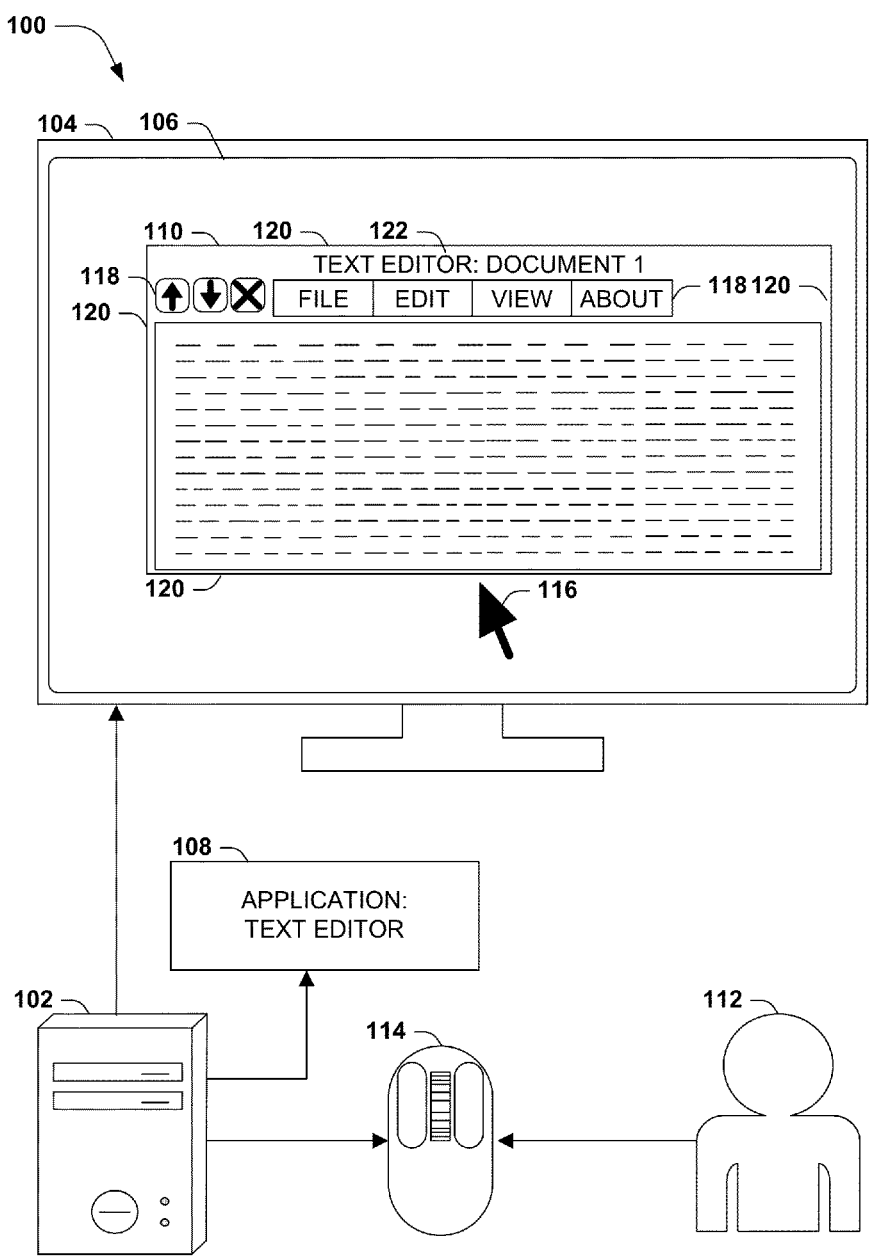
FIG. 1 is an illustration of an exemplary scenario featuring a set of regions presented in a graphical computing environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a graphical computing environment comprising a set of regions. Such regions may comprise, e.g., a window, a rendering of a media object, a menu bar, a toolbar, a notification dialog, an icon representing an application or document, or a widget embedded in a desktop. Such graphical computing environments may be generated on a device, e.g., by first rendering a background color or background image; by rendering one or more regions for each application executing on the device; and by presenting the renderings on a display component of the device, such as a monitor. Each region is typically associated with an application executing on the device, and may be configured to present visual output from the application within the region and/or convey input directed to the region to the application. Such applications may include user applications, renderings of media objects, configuration dialogs, games, operating system applications (e.g., a file explorer), and graphical interfaces for background service (e.g., a notification icon stored in a notification icon area).

A user may be permitted to interact with the regions presented in the graphical computing environment. As one such example, the device may comprise a pointing device, such as a mouse, a trackball, a trackpad, a drawing tablet, a touchscreen, a stylus, a targeting element such as an infrared emitter, and/or a camera configured to detect a manual pointing gesture of a user at the display component. These pointing devices may be used to control a pointer presented on the display (e.g., represented by a cursor such as an arrow), and the user may utilize the pointer to select, activate, and interact with various regions; e.g., the user may slide a mouse on a flat surface to achieve corresponding movement of the pointer, may position the pointer over a region of interest, and may click a button on the mouse to indicate a selection of the region. The device may be configured to support many such operations through the pointing device (e.g., clicking with one or more particular buttons, double-clicking, dragging an item such as an icon, or creating a marquee or "lasso" to select an area or items of interest). The device may also evaluate the input of the pointing device to identify gestures performed with the pointer (e.g., a "shaking" of the cursor) and/or of the pointing device (e.g., a single-multitouch gesture performed on a touchpad that is to be processed in lieu of corresponding movements on the touchpad). Such manipulations may enable the execution of many types of activities, including selecting and/or unselecting items; invoking, switching to, or terminating particular applications; and zooming into or out of a region.

In addition to operations invoked solely through the input of the pointing device, pointer-based user interfaces are frequently used in conjunction with various types of visual controls, such as depressable buttons, selectable radio buttons, checkboxes, sliders, lists, numeric up/down controls, menus and pickers. These visual controls may be confluent with a region (e.g., adjacent to or overlapping a region). For example, a window is often presented with a visual frame; a set of buttons at a top corner of the window for frequently invoked window management functions, such as maximizing, restoring, minimizing, and closing an application; and a top menu bar providing a set of invokable operations exposed by the application. These controls may be applied by default to the region by the operating system or specified by the application associated with the region, and may be positioned in an independent, floating, detachable, dockable, and/or attached manner with respect to the region.

Of particular relevance to the present disclosure are techniques for achieving a repositioning of a region on the display. Such repositioning may involve, e.g., altering the location of a region on the display; resizing the region; switching to a particular view mode (e.g., a maximized, fullscreen, windowed, or hidden view mode); and moving the region to a different display (e.g., from a first monitor to a second monitor connected to the same device; from a first virtual display space to a second virtual display space of the same device; or to a display component of a different device). Because regions are very frequently repositioned in window-based graphical computing environments, such devices often provide several ways to invoke the repositioning of a region. For example, the maximize, restore, and minimize buttons attached to a graphical window enable the repositioning of the window at predefined sizes and locations; the graphical frame of a window enables a user to position the pointer over an edge of the window and drag to adjust the size of the window; and menu options in a standard application menu enabling the maximizing, restoring, and minimizing of the region. Additional input options may be included to reposition the region without the use of a visual repositioning control; e.g., keyboard shortcuts may be provided to invoke the maximize, restore, and minimize commands, and a "throw" pointer gesture may be implemented to enable a user to "grab" a region with the pointer and rapidly move the pointer to a particular location of the display in order to "throw" it into that location.

FIG. 1 presents an illustration of an exemplary scenario 100 featuring a device 102 having a display 104 (e.g., a liquid crystal display (LCD) monitor) whereupon is presented a graphical computing environment 106, comprising a set of regions visually representing different applications executing on the device 102. For example, in order to present an application 108 comprising a text editor, the device 102 may render within the graphical computing environment 106 a region 110 comprising a window presenting the textual content of a document and various user controls that may be invoked to perform various operations on the document. In order to interact with the visual computing environment 106, a user 112 may manipulate a pointing device 114, such as a mouse, to control a pointer 116 positioned at a location within the graphical computing environment 106. Fur example, the user 112 may position the pointer 116 over a visual control 118 confluent with the window, such as a button or menu bar, and may click a button on the mouse to activate the visual control 118. While the region 110 is activated (e.g., while the pointer 116 is positioned over the region 110, or while the region 110 is selected as an input focus), input received from the user 112 may be directed to the application 108 associated with the region 110. Additionally, the graphical computing environment 106 may present the region 110 as the visual output of the application 108 bordered by a window frame 120 that may be manipulated with the pointer 116 to reposition the region 110. For example, the graphical computing environment 106 may enable the user 112 to double-click on the title bar portion 112 of the region 110 to maximize or restore the size of the region 110 to fill the display 106, or to restore a maximized region 110 to a non-maximized windowed state; to "grab" a title bar portion 122 of the window frame near the top of the region 110 with the pointer 116 and "drag" the pointer 116 to move the region 110 to a new location without resizing; and to "grab" an edge of the window frame 120 with the pointer 116 to adjust the position of that edge of the window frame 120 (e.g., grabbing and dragging the right edge of the window frame 120 to move the right edge of the region 120 left or right, thus resizing the region 120 by narrowing or widening, respectively, the size of the region).

However, the implementation of visual controls 118 for respective regions 110 may consume space within the graphical computing environment 106. For example, in the exemplary scenario 100 of FIG. 1, approximately 10% of the display space devoted to the region 110 is consumed by visual controls 118, including the title bar 122; the window frame 120; the maximize, minimize, and close buttons; and the menu. Moreover, some of these elements are embedded in non-interactive visual elements in order to provide visual alignment and/or consistency among regions 110; e.g., the area from the right edge of the close button to the right edge of the frame is entirely reserved for the menu bar, but is only partially utilized, resulting in a non-functional block of the region. In this exemplary scenario, these visual elements together reduce the size of the region 120 devoted to presenting output from the application 108 by at least 10%, and more complex applications 108 may present even more visual controls 118 that consume further display space. Moreover, the functionality provided by a visual control 118 may be redundant with other visual controls 118; may be invoked only occasionally or rarely, despite its ubiquitous presentation; and may be handled entirely by the logic of the application 108 (e.g., the application 108 may present an option within the region 110 to exit the application at an appropriate time, thereby rendering the "close" button irrelevant and confusing).

These and other considerations may encourage a reduction in the amount of redundant, infrequently invoked, and/or non-functional visual elements ("chrome") attached to regions 110 within the graphical computing environment 106, thus maximizing the portion of the region 110 dedicated to the output of the application 108. However, users 112 may nevertheless wish to invoke the functionality provided by the visual controls 118 omitted from the region 110, and it may be undesirable to relegate the implementation of such functionality to the application 108. Therefore, it may be desirable to design the graphical computing environment 106 to provide such functionality other than through the use of "chrome."

One such technique is the implementation of "gestures," whereby a particular motion of the pointer 116 may be associated with a particular functionality, such as the "marquee" or "lasso" gesture whereby the drawing of a rectangle enclosing a set of items in a list results in a selection of the enclosed items, or double-clicking a button on a pointing device to activate an item indicated by the pointer 116. However, at present, gestures for repositioning a region 110 are not widely recognized, particularly in the absence of "chrome." For example, users 112 may readily recognize a moving of a region 110 by dragging the region 110 from a first location to a second location. However, such dragging is often initiated by a title bar 122 that is otherwise non-interactive, and therefore desirably removed in order to reduce the "chrome" of the region 120. Moreover, attempting to move the region 110 by dragging within the region 110 may conflict with providing input to the application 108 associated with the region 110, resulting in unanticipated, inconsistent, and/or ambiguous behavior of the graphical computing environment 106. Similar problems may arise from attempting to resize the region 110 in the absence of a window frame 120. In view of these difficulties, it may be desirable to devise gestures that enable users 112 to reposition a region 110 (e.g., moving the region 110 to a different location; resizing the region 110; switching the view mode of the region 110 among full-screen exclusive, maximized, non-maximized, and hidden modes; and moving the region 110 to a different display 104 of the same or a different device 102) in the absence of visual controls 118, in order to promote the reduction of the "chrome" of the region 110.

B. Presented Techniques

Presented herein are techniques for enabling users 112 to reposition regions 110 through the development of pointer-based gestures that distinguish between interactions with the application 108 within the region 110 and repositioning of the region 110. Moreover, it may be desirable to select gestures that are readily accessible to and rapidly performed by users 112. Relevant to such considerations, a principle known within the field of human-computer interaction identified as Fitts' Law specifies that the accessibility of an area presented on a display is proportional to the size of the area. More particularly, an edge of a display 104 is particularly accessible with a pointing device 114 like a mouse because movement past the boundary of the edge is restricted, and the user 112 may err on the side of rapidly moving the pointer 116 toward the edge. Therefore, choosing gestures that are associated with an edge of the display 104 to achieve a repositioning of regions 110 may present some user interface advantages.

In accordance with these considerations, the techniques presented herein enable a user 112 to enter a region repositioning mode with respect to a particular region 110 by performing a gesture with respect to an edge of the display 104 near the region 110. In particular, for a region 110 near an edge of the display 104 near the region 110, the gestures involve a hovering of the pointer 116 for a brief "hovering" duration near the associated edge of the display 104 to enter a region repositioning suggestion mode, followed by movement of the pointer 116 away from the edge (optionally while activating the pointer 116 during the movement, e.g., depressing a button of a mouse or a "drag" away from the edge of the display 104). It may be appreciated that if the region 110 is near but not adjacent to the edge of the display 104, the gesture may be performed in the gap between the region 110 and the edge, and may therefore not be construed as interacting with the region 110. Alternatively, if the region 110 is adjacent to the edge, the "hovering" of the gesture to enter the repositioning mode may differentiate interaction with the portion of the region 110 near the edge of the display 104 and the initiation of the repositioning gesture. Upon detecting such a gesture, the graphical computing environment 106 may enter a region repositioning mode for the region 110; e.g., the user 112 may then draw a rectangle to represent the new location and size of the region 110, may drag the region 110 to a new location and/or resize the edges of the region 110 (where such input is not construed as interaction with the region 110 during the region repositioning mode), and/or may choose one or more suggested locations and/or sizes of the region 110 (e.g., the graphical computing environment 106 may present a set of suggested repositionings, and the user 112 may point to one with the pointer 116 and release the button of the pointing device 114). In this manner, the detection of such gestures may enable the user 112 to invoke a repositioning of a region 110 in an unambiguous manner without interacting with visual repositioning controls confluent with the region 110, thereby promoting the reduction of "chrome" while preserving the accessibility of the repositioning functionality of the region 110 within the graphical computing environment 106.

Figure 2:
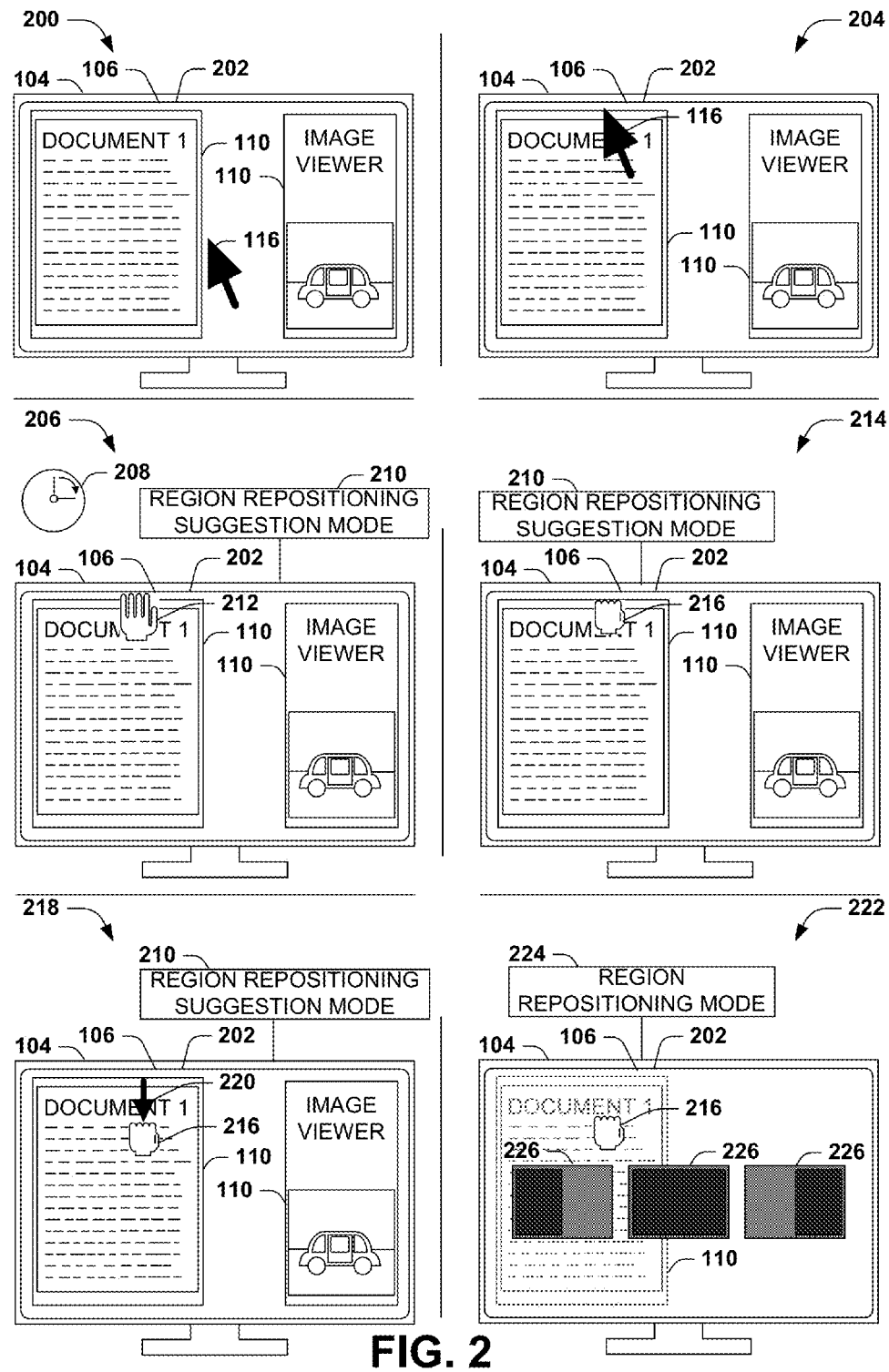
FIG. 2 is an illustration of an exemplary scenario featuring a gesture for repositioning a chromeless region in accordance with the techniques presented herein.

FIG. 2 presents an illustration of an exemplary scenario, comprising a sequence of time points, featuring an exemplary gesture that may be performed to invoke a region repositioning mode with respect to a region 110 in a graphical computing environment 106. In this exemplary scenario, at a first time point 200, the graphical computing environment 106 presents on the display 104 of a device 102 two regions 110 respectively corresponding to an application 106 (e.g., a text editing application presenting a document and an image viewing application presenting an image). Such regions 110 are presented in a "chromeless" manner, i.e., with a minimum of visual controls 118, including no discernible visual repositioning controls. However, each region 110 is positioned near at least one edge 202 of the display 104. In order to reposition the first region 110, and as illustrated at a second time point 204, the user 112 may position the pointer 116 near the portion of the top edge 202 of the display 104 that is near the first region 110. The user 112 may then "hover" the pointer 116 in this location for a brief duration without providing significant additional input (i.e., without significantly moving the pointer 116; without activating or deactivating the pointer 116, such as by interacting with buttons of a pointing device 114 or depressing or lifting the tip of a stylus; and without providing input through another input device, such as a keyboard). The device 102 may also identify the region 110 near the edge 220 of the display 104 indicated by the cursor 116, which may be regarded as the "selected" region 110 for which the region repositioning gesture, if completed, is to be invoked. At a third time point 206, after a hover duration 208 has elapsed without receiving such significant input, the graphical computing environment 106 may enter a region repositioning suggestion mode 210 that indicates the initiation of the repositioning gesture and the availability of a region repositioning mode if the repositioning gesture is completed. In this exemplary scenario, the region repositioning suggestion mode is indicated by changing the pointer 116 to a different visual pointer style 212, such as depicting the pointer 116 as an open hand.

As further illustrated in FIG. 2, at a fourth time point 214 (presented in this exemplary scenario as an optional variation of these techniques), while in the region repositioning suggestion mode 210, the user 112 may activate the pointer 116 (e.g., by depressing a button of a pointing device 114 associated with the pointer 116), causing the pointer 116 to change to a third visual style 216 indicating the further performance of the gesture (e.g., a closed fist, which may suggest that the user has "grabbed" the edge 202 of the display 104). At a fifth time point 218, the user 112 may invoke a movement 220 of the pointer 116 away from the edge 202 of the display 104, thereby completing the repositioning gesture. In response, and as illustrated at a sixth time point 222, the completion of the repositioning gesture causes the graphical computing environment 106 to enter a region repositioning mode 224 with respect to the region 110. For example, the graphical computing environment 106 may hide all of the regions 110 except the selected region 110; may display the selected region 110 (and, optionally, the background of the graphical computing environment 106) with a dimmed, muted, and/or low-contrast appearance; and atop the selected region 110 and the background, may present some region repositioning suggestions 224 of the selected region 110, such as a left half of the display 104, a right half of the display 104, and a maximized mode filling the display 104. If the user 112 positions the pointer 116 over or near a region repositioning suggestion 224 and deactivates the pointer 116 (e.g., by releasing the depressed button of the pointing device 114), the graphical computing environment 106 may reposition the selected region 110 according to the selected region repositioning suggestion 224. Alternatively, if the user 112 provides any other input (e.g., not completing the repositioning gesture; providing contrary input while in the region repositioning suggestion mode 210 or the region repositioning mode 224, such as keyboard input; or deactivating the pointer 116 before completing the repositioning gesture or while not pointing at a suggested region repositioning), the region repositioning suggestion mode 210 and/or region repositioning mode 224 of the device 102 may be canceled, and the graphical computing environment 106 may return to an initial or normal operating mode. In this manner, the user 112 may utilize the illustrated, exemplary repositioning gesture to initiate a repositioning of a selected region 110 in an accessible, unambiguous, and chromeless manner according to the techniques presented herein.

C. Exemplary Embodiments

Figure 3:
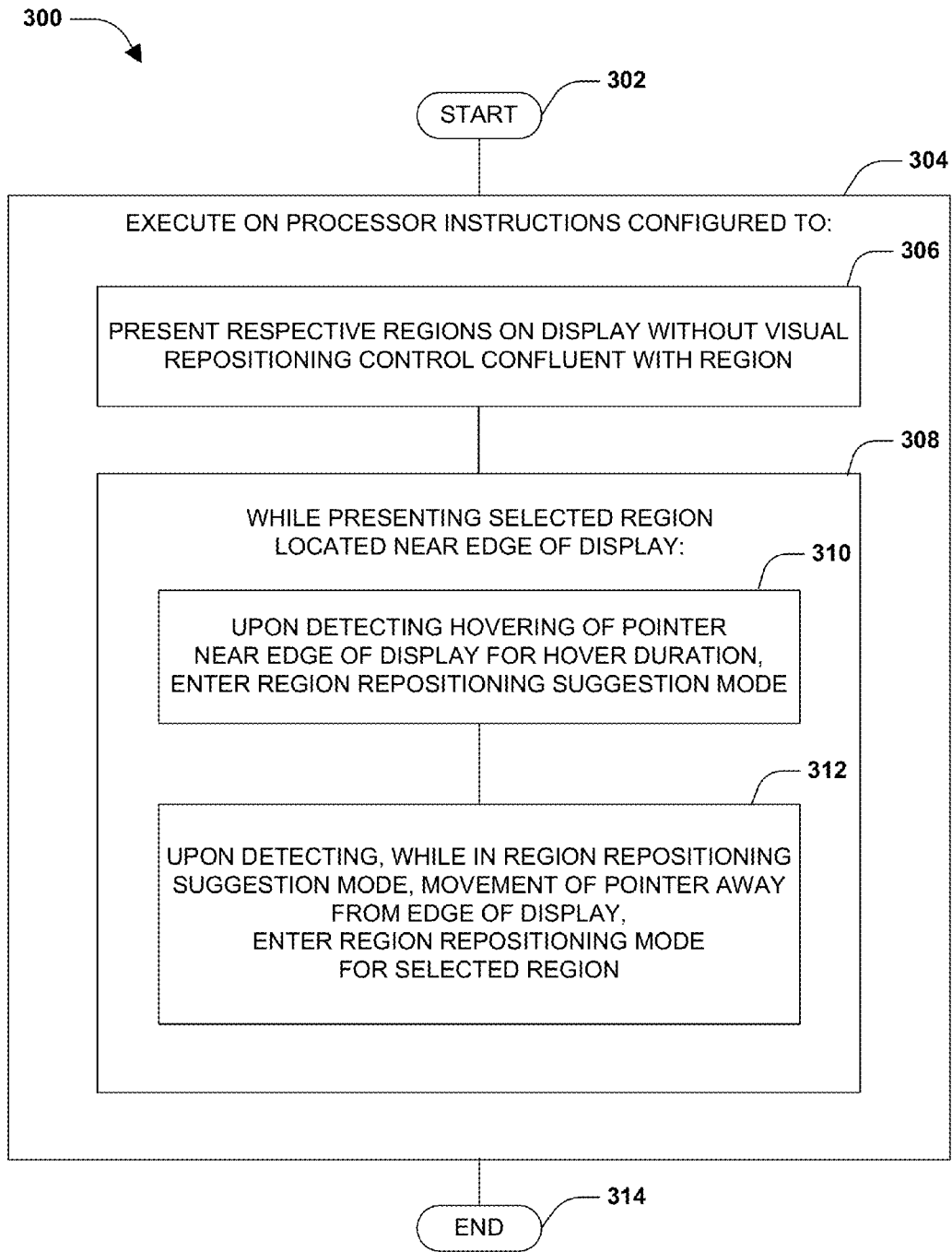
FIG. 3 is a flowchart illustrating an exemplary method of enabling repositioning of regions in a graphical computing environment in accordance with the techniques presented herein.

FIG. 3 presents a first exemplary embodiment of the techniques presented herein, illustrated as an exemplary method 300 of enabling repositioning of regions 110 within a graphical computing environment 106, and particularly in the absence of region resizing controls confluent with the regions 110. The exemplary method 300 may involve a device 102 having a processor, a display 104, and a pointing device 114 associated with a pointer 116 presented within the graphical computing environment 106. The exemplary method 300 also involves a set of instructions stored in a memory component of the device 102 (e.g., a memory circuit, a platter of a hard disk drive, a solid-state storage device, or a magnetic and/or optical disc) that, when executed on the processor of the device, causes the device to apply the techniques presented herein. Accordingly, the exemplary method 300 begins at 302 and involves executing 304 the instructions on the processor of the device 102. More specifically, the instructions are configured to present 306 respective regions 110 on the display 104 without a visual repositioning control confluent with the region 110. The instructions are also configured to, while presenting 308 a selected region 110 located near an edge 202 of the display 104, upon detecting a hovering of the pointer 116 near the edge 202 of the display 104 for a hover duration 208, enter 310 a region repositioning suggestion mode 210; and upon detecting, while in the region repositioning suggestion mode 210, a movement 220 of the pointer 116 away from the edge 202 of the display 104, enter 312 a region repositioning mode 224 for the selected region 110. In this manner, the exemplary method 300 enables users 112 to invoke a repositioning of regions 110 of the graphical computing environment 106 in the absence of visual repositioning controls associated with the regions 110, and thus ends at 314.

Another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
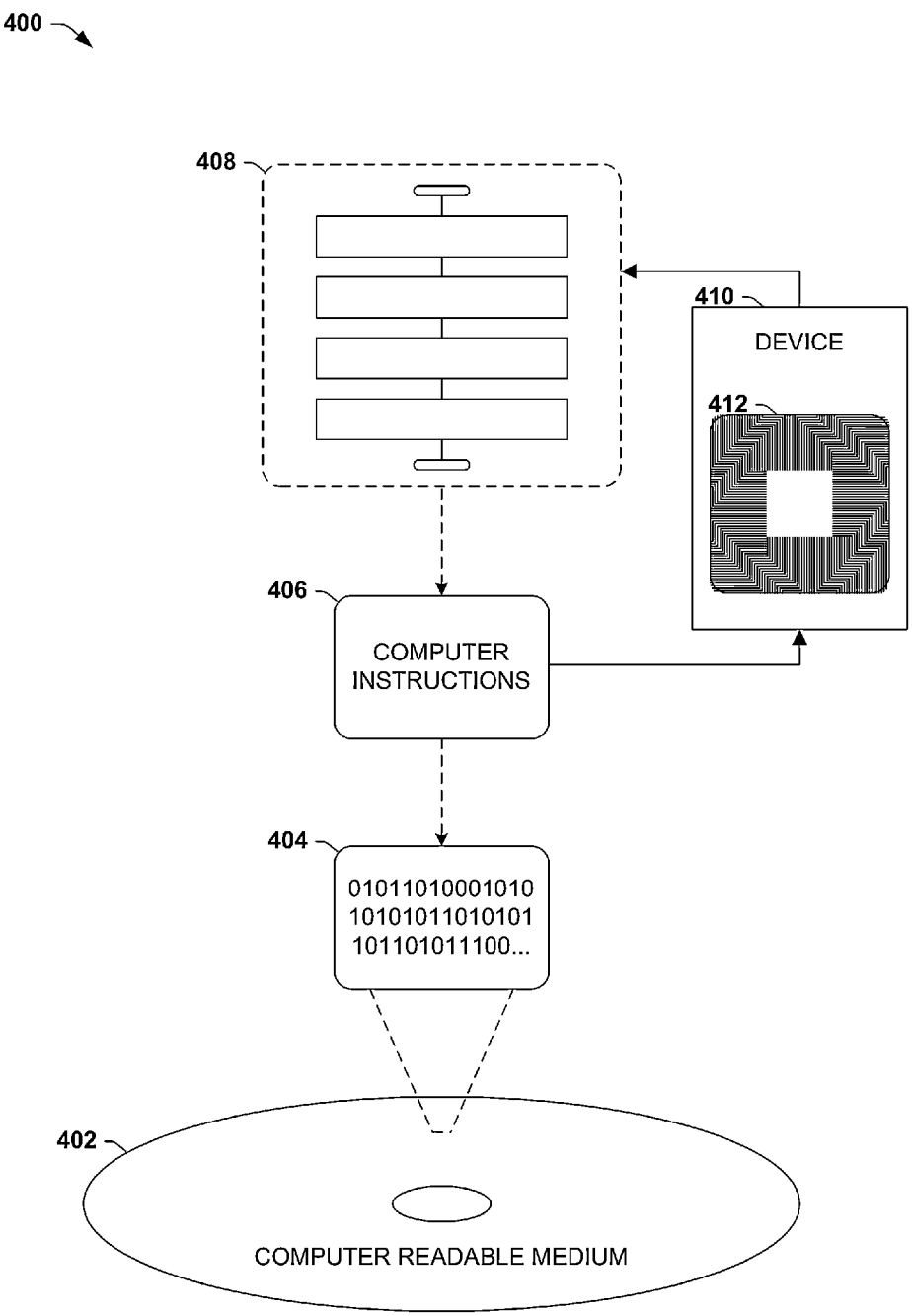
FIG. 4 is an illustration of an exemplary storage device comprising processor-executable instructions configured to embody one or more of the provisions set forth herein.

An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 configured to operate according to the principles set forth herein. In one such embodiment, the processor-executable instructions 406 may be configured to perform a method of enabling users 112 to reposition regions 110 in the absence of visual repositioning controls, such as the exemplary method 300 of FIG. 3. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3) to confer individual and/or synergistic advantages upon such embodiments.

D1. Scenarios

A first aspect that may vary among embodiments of these techniques relates to the scenarios wherein such techniques may be utilized.

As a first variation of this first aspect, these techniques may be utilized with many types of devices 102, such as servers, workstations, laptop or palmtop computers, tablets, phones, personal data assistants, media players, game consoles, and appliances.

As a second variation of this first aspect, these techniques may be utilized with many types of displays 104, such as active- or passive-matrix liquid crystal displays (LCD), organic or traditional light-emitting diode (LED) displays, cathode-ray-tube (CRT) displays, and projectors. Such displays 104 may also exhibit various features, including various physical sizes, aspect ratios, resolutions, pixel densities, adjustable properties, and three-dimensional image simulation. The device 102 may also have one or multiple displays 104 arranged in various ways (e.g., an aggregate desktop presented seamlessly across the displays 104, a set of distinct and isolated display spaces presented on different displays 104, or a mirrored desktop that is partially or wholly redundantly presented on several displays 104). Additionally, in some variations, a first device 102 may apply the techniques presented herein for regions 110 presented on a display 104 of a second device 104 (e.g., a terminal services client presenting on a display 104 the graphical computing environment generated by a terminal server).

As a third variation of this first aspect, these techniques may be utilized with many types of pointing devices 114, such as a mouse, trackball, trackpad, pointing stick, joystick, or drawing tablet. The pointing device 114 may also be incorporated in the display 104, such as a magnetic or capacitive touch-sensitive display capable of detecting touch by a finger of a user 112 or by a stylus. Other pointing devices 114 may include a camera, and may correlate movements of the pointer 116 with movements of a user (e.g., applying image evaluation techniques to detect the body position and physical gestures of the user 112) or a pointing device, such as an infrared emitter. Such pointing devices 114 may also include various properties that may affect the pointer 116, such as sensitivity, acceleration, the inclusion of buttons and/or wheels, the detection of various axes of movement (possibly including a third dimensional axis and/or gyroscopic sensors detecting device attitude such as tilt), and sensitivity to the touch of the user, as in a touch-sensitive mouse. As a further variation, such pointing devices 114 may generally correlate with the pointer 116 in various modes, such as an absolute correlation (e.g., on a touch-sensitive display 104, the location touched by the user 112 is the location of the point 116; or on a touchpad, the size and dimensions of the touchpad may be scaled to the size and dimensions of the display 104, such that touching a particular location on the touchpad positions the pointer 116 at the corresponding scaled position on the display 104) and a relative correlation (e.g., input from a mouse or touchpad may be interpreted not as a location of the pointer 116 on the display 104, but as directional motion of the pointer 116 within the graphical computing environment 106).

As a fourth variation of this first aspect, these techniques may be utilized to reposition many types of regions 110 within a graphical computing environment 106, such as modal or modeless windows, interactive and non-interactive dialogs, toolbars, menu bars, renderings of media objects such as documents and images, icons, and widgets embedded in a desktop.

As a fifth variation of this first aspect, the gestures presented herein may invoke many types of region repositioning modes 224 on the device 102. As a first example, the region repositioning mode 224 may simply allow the user to manipulate the selected region 110 in the manner of a window (despite the absence of visual repositioning controls) by dragging and/or resizing the boundaries of the region 110. As a second example, the region repositioning mode 224 may permit the user 112 to draw a rectangle or other shape indicating the new location, size, and shape of the region 110. As a third example, and as illustrated in FIG. 2, the graphical computing environment 106 may present one or more region repositioning suggestions, and may apply a repositioning selected by the user 112 to the selected region 110. These and other types of region repositioning modes 224 may be invoked by the repositioning gestures presented herein. Those of ordinary skill in the art may devise many scenarios wherein the techniques presented herein may be utilized.

D2. Gesture Variations

A second aspect that may vary among embodiments of these techniques relates to variations in the gestures detectable by such techniques.

As a first variation of this second aspect, the association between an edge 202 of the display 104 and an edge of a nearby region 110 may be determined in many ways. As a first example, a region 110 may be associated with an edge 202 of the display 104 only if it is located adjacent to (e.g., positioned against) the edge 202. As a second example, a region 110 may be associated with an edge 202 of the display 104 if it is within a particular threshold distance of the edge 202, e.g., within forty pixels of the edge 202. As a third example, when the pointer 104 is detected to hover near an edge 202 of the display 104, the device 102 may select the region 110 that is positioned nearest the edge 202, optionally taking into account the layering ("Z-order") of the regions 110 in a layered graphical computing environment 106. As a fourth example, for respective regions 110, a repositioning area of the display 104 may be identified, such that if the pointer 116 is determined to hover in such a repositioning area, the graphical computing environment 106 may initiate a region repositioning suggestion mode 210 for the region 110. As a further variation, the detection may involve only particular edges 202 of the display 104 (e.g., only the top edge), and/or may only involve some regions 110. For example, one or more specific regions 110 may be defined as unrepositionable through the invocation of the region repositioning mode, such as regions 110 appearing in a fixed location and size on the display 104, may not be selectable for repositioning in this manner, and the graphical computing environment 106 may refrain from detecting hovering of the pointer 106 near edges 202 of the display 104 that are near unrepositionable regions 110. As a still further variation, the association of regions 110 with respective edges 202 of the display 104 may be determined on an ad hoc basis (e.g., upon detecting a hovering of the pointer 116 near an edge 202, evaluate the positions of the regions 110 to determine nearness to the edge 202) and/or on an advance basis (e.g., upon positioning a region 110, determine the nearby edges 202 of the display 104, and store such determinations for later use upon detecting a hovering of the pointer 116 near an edge 202).

Figure 5:
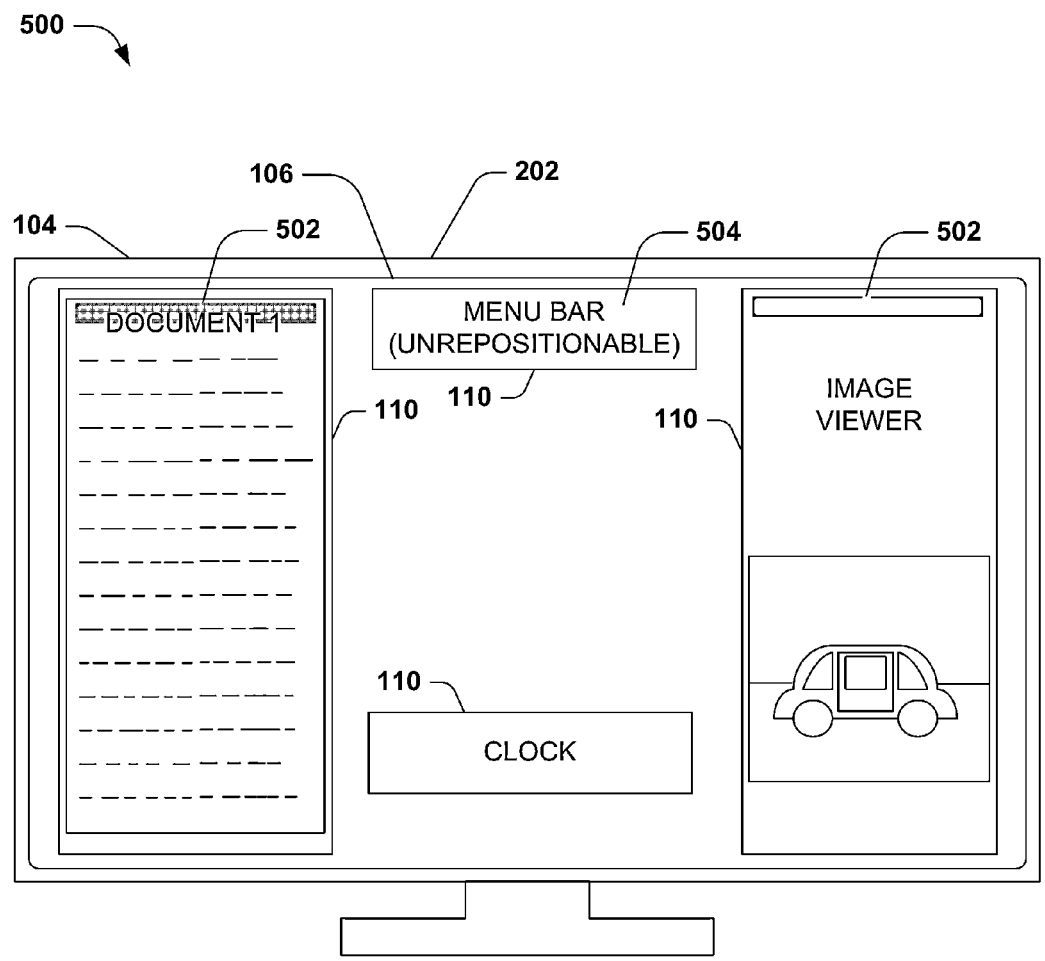
FIG. 5 is an illustration of an exemplary scenario featuring definitions of chromeless repositioning areas for respective regions in accordance with the techniques presented herein.

FIG. 5 presents an illustration of an exemplary scenario 500 featuring a presentation of regions 110 in a graphical user environment 106 utilizing some of these variations. In this exemplary scenario 500, four regions 110 are presented on the display 104, and repositioning areas 502 may be identified within which a hovering of the pointer 106 may invoke a region repositioning suggestion mode 210 for the region 110. For example, a first region 110 may be detected as near a portion of a top edge 202 of the display 104, and a repositioning area 502 may be defined along at least portion of a lateral edge of the first region 110 that is adjacent to the edge of the display 104, as well as a repositioning area depth (e.g., up to twenty pixels away from the edge 202 of the display 104), thus forming a rectangle within which the user 112 may hover the pointer 116 to initiate the repositioning gesture to reposition the first region 110, even in the absence of visual repositioning controls indicating the repositioning area 502. A second region 110, positioned along the right edge of the display 104, may similarly have a defined repositioning area 502 within which the pointer 116 may be hovered to initiate the reposition gesture for the second region 110. However, a third region 110, comprising a menu bar fixably presented at the top of the display 104, may be unrepositionable, and therefore may not have a defined repositioning area 502. Additionally, a fourth region 110 may not be positioned near any edge 202 of the display 104 (or may not be positioned near a particular edge 202 for which the graphical computing environment 106 implements the techniques presented herein), and thus, while possibly repositionable, may not have a defined repositioning area 502 and therefore may not be repositionable by the repositioning gestures presented herein. When the device 102 detects a hovering of the pointer 116, it may simply compare the location of the pointer 116 with the defined repositioning areas 502 in order to determine whether to enter a region repositioning suggestion mode 210, thus efficiently achieving the identification of a selected region 110 for repositioning according to the techniques presented herein.

As a second variation of this second aspect, the hover duration 208 preceding the detection of a hovering of the pointer 116 may be variably defined, and/or may be adjustable by the user 112, an application 108, or the graphical computing environment 104. For example, the hover duration 208 may be lengthened or shortened based on such circumstances as the dexterity or preferences of the user 112, the type of device 102, and the other types of operations that might have been intended by the user 112 (e.g., the similarity of the gesture to other gestures within the graphical computing environment 106). In scenarios where such user input is comparatively unambiguous, the hover duration 208 may be reduced to a very brief duration, or even set to zero.

As a third variation of this second aspect, the repositioning gesture may be defined to include, between the hovering of the pointer 116 and the movement 220 of the pointer 116 away from the edge 202 of the display 104, an activation of the pointer 116, e.g., a detected depression of a button on a mouse. This activation of the pointer 116 may cause the following movement 220 to resemble a "drag" gesture as part of the repositioning gesture, further decreasing the ambiguity of the gesture. The device 102 may therefore be configured to transition from the region repositioning suggestion mode 210 to the region repositioning mode 224 only upon the region repositioning mode upon detecting an activation of the pointer 116 followed by the movement 220 of the pointer 116 away from the edge 202 of the display 104.

As a fourth variation of this second aspect, the movement 220 of the pointer 116 away from the edge 202 of the display 104 may be defined as many ways, including a particular repositioning movement length (e.g., a movement of at least ten pixels, away from the location of the hovering of the pointer 116 that initiated the repositioning gesture). The repositioning movement length may be defined in many ways, e.g., as a fixed logical or physical length (optionally taking into account the pixel size of the display 104), and/or as a percentage of the display dimension of the display 104 perpendicular to the edge 202 (e.g., if a relocation gesture is initiated near a left edge of the display 104, the repositioning movement length may be defined as 5% of the width of the display 104). Moreover, the movement 220 may be designed to filter out unintended variation (e.g., to tolerate a particular amount of lateral movement of the pointer 116 parallel to the edge 202 of the display 104 in addition to movement of the pointer 116 away form the edge 202 of the display 104).

As a fifth variation of this second aspect, while the pointer 106 is hovering, and/or while the device 102 is in a region repositioning suggestion mode 210 or a region repositioning mode 224, the device 102 may be configured to evaluate input from the user 112 in various ways. As a first example, input associated with the pointer 116 during the performance of a repositioning gesture and/or a repositioning of the region 110 may be withheld from the application 108 associated with the region 110 (e.g., in order to reduce unintended interaction with the application 108 while the user 112 is attempting to reposition the region 110). As a second example, extraneous input received during a potential relocation gesture (e.g., the detection of a hovering of the pointer 116 in a repositioning area 502 followed not by the movement of the pointer 116 away from the edge 202 of the display during an activation of the pointer 116, but by keyboard input) may result in a cancellation of the hovering, the region repositioning suggestion mode 210, and/or the region repositioning mode 224; i.e., the user 112 may avoid or cancel an unintended invocation of the region repositioning mode 224 by not completing the repositioning gesture or providing other input interrupting the repositioning gesture of the pointer 116. As an additional variation, the extraneous input may be sent to an application 108 associated with the selected region 110, e.g., in order to avoid accidentally intercepting input intended for the application 108 by misconstruing such input as the initiation of a repositioning gesture.

As a sixth variation of this second aspect, the various modes of the device 102 involved in the repositioning of regions 110 (e.g., the region repositioning suggestion mode 210 and the region repositioning mode 224) may be indicated within the graphical computing environment 106 in various ways. In particular, the device 102 may indicate the current mode through a visual pointer style applied to the pointer 116. For example, and as illustrated at the third time point 206 in FIG. 2, a visual pointer style 212 may be applied to the pointer 116 upon transitioning to the region repositioning suggestion mode 210. Additionally, if the repositioning gesture involves an activation of the pointer 116 (such as illustrated at the fourth time point 214), the device 102 may transition to a second visual pointer style 212, indicative of an imminent availability of the region repositioning mode 224 (e.g., an entry of the region repositioning mode 224 upon movement 220 of the pointer 116 away from the edge 202 of the display 104). These and other visual indications of respective modes of the device 102 may be presented in addition to visual resize controls, or in the absence of visual resize controls (e.g., by refraining from presenting visual resize controls other than the visual pointer style 212 of the pointer 116).

As a seventh variation of this second aspect, while in a region repositioning mode 224 for a selected region 110, the graphical computing environment 106 may provide various options for terminating the region repositioning mode 224. For example, upon receiving a selection of a region repositioning suggestion 226 or input signaling a termination of the region repositioning mode 224 (e.g., the release of a button of the pointing device 114 that was activated as part of the repositioning gesture), the device 102 may terminate the region repositioning mode 224 and accordingly reposition the selected region 110. Alternatively or additionally, the graphical computing environment 106 may construe other input as a cancellation of the region repositioning mode 224 without repositioning the selected region 110. Those of ordinary skill in the art may devise many such variations of the repositioning gestures that may be compatible with the techniques presented herein.

D3. Additional Variations

As a third aspect of the techniques presented herein, additional variations of the repositioning gestures may be devised in view of additional details the visual computing environment 106.

As a first variation of this third aspect, the regions 110 presented within the graphical computing environment 106 may include a background that is presented under the other regions 110 of the graphical computing environment 106. The background may be presented as a background region having a region size matching the size of the display 104. Moreover, if the repositioning gesture is performed within the graphical computing environment 106 in an area that is not near any of the other regions 110, the graphical computing environment 106 may enter a background region repositioning mode, which may enable operations with respect to the background. As one such example, the background region repositioning mode may enable an all regions repositioning mode, which may enable a repositioning of all other regions 110 presented in the graphical computing environment 106 as a more efficient repositioning mechanism than individually repositioning each region 110.

Figure 6:
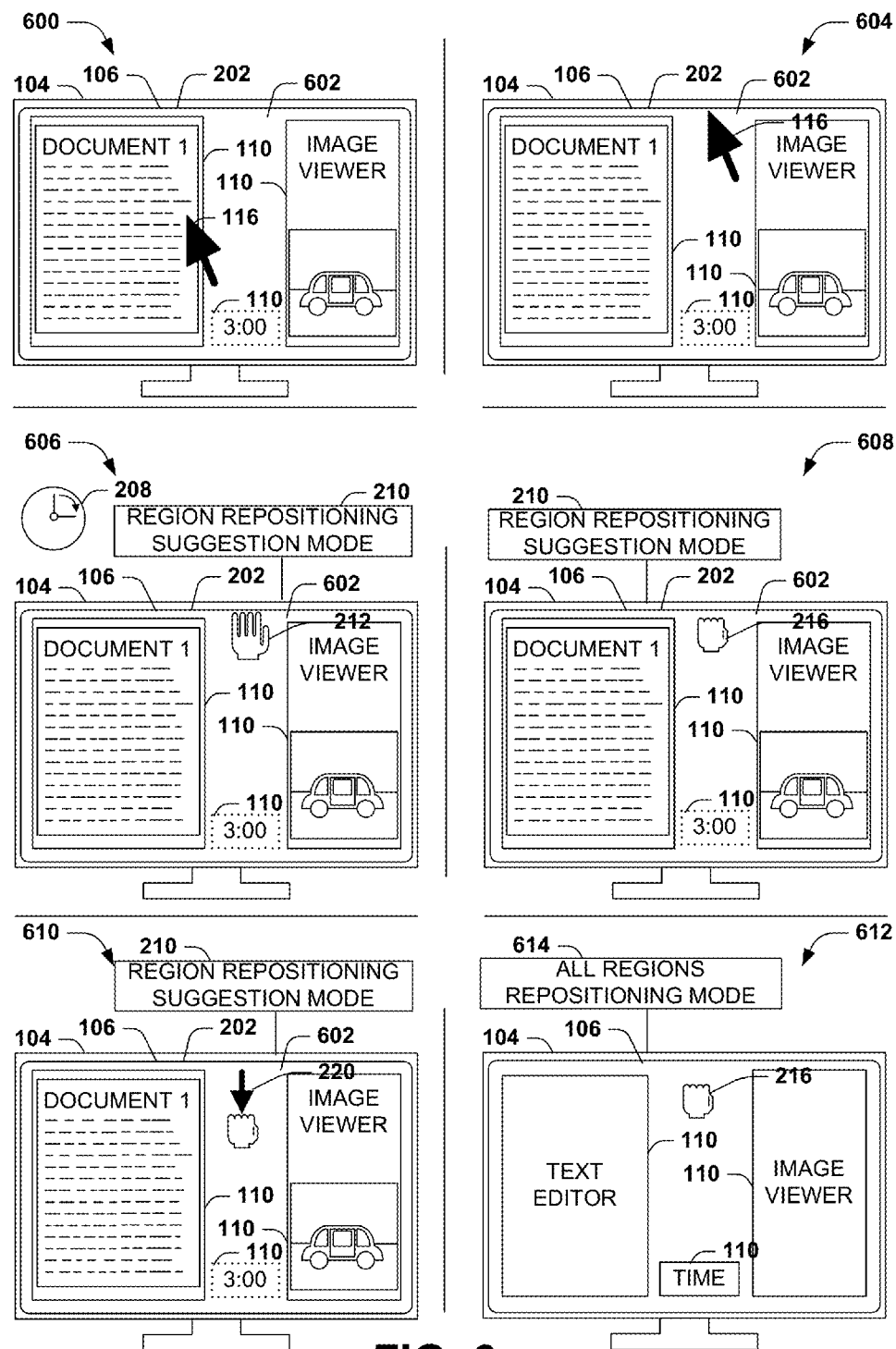
FIG. 6 is an illustration of an exemplary scenario featuring a repositioning gesture applied to a background region and an all-regions repositioning mode invoked thereby in accordance with the techniques presented herein.

FIG. 6 presents an illustration of an exemplary scenario featuring an all regions repositioning mode. In this exemplary scenario, at a first time point 600, the graphical computing environment 106 may present two regions 110, which may be respectively positioned near various edges 202 of the display 104. The regions 110 may also include a background region 602 representing a background presented under the other regions 110 of the graphical computing environment 106. At a second time point 606, the user may position the pointer 116 near the edge 202 of the display 104 that is not near the other regions 110, and may hover the pointer 116 in this location for a hover duration 208, thereby causing the device 102 (at a third time point 606) to enter a region repositioning suggestion mode 210 and apply a first visual pointer style 212 to the pointer 116. At a fourth time point 608, the user 112 may activate the pointer 106, causing a second visual pointer style 216 to be applied to the pointer 106 to indicate the imminent availability of a region repositioning mode 224. At a fifth time point 610, the user 112 may perform a movement 220 of the pointer 116 away from the edge 202 of the display 104, thereby completing the repositioning gesture and causing the device 102 to enter a region repositioning mode 224. However, because no region 110 is located near the edge 202 of the display 104 where the repositioning gesture has been performed, the graphical computing environment 106 may construe the repositioning gesture as applying to the background region 602. Accordingly, at a sixth time point 612, the graphical computing environment 106 may enter an all regions repositioning mode 614, whereby all regions 110 are presented (perhaps in a simplified form, e.g., as only a bare rectangle comprising the title of the associated application 108), indicating that input from the user 112 is not directed to the respective applications 108, but used to reposition the regions 110. The user 112 may therefore reposition regions 110 within the graphical computing environment 106 until terminating the all regions repositioning mode 614 through predefined input (e.g., activating the pointer 116 on the background region 602). In this manner, the graphical computing environment 106 may interpret the completion of the repositioning gesture on the background region 602 as a request to reposition all of the other regions 110, and may correspondingly present an all regions repositioning mode 614 designed to facilitate this request.

As a second variation of this third aspect, the graphical computing environment 106 may be configured with various modes that variably display or hide visual repositioning elements confluent with the regions 110. For example, the graphical computing environment 106 may be presented on mobile devices, which may include small displays 104 where the reduction of user interface "chrome" may present a high priority, and on workstations, which may include large displays 104 where such reduction may present a lower priority. Accordingly, the graphical computing environment 106 may include a visual repositioning control hiding mode where regions 110 are presented without confluent visual repositioning controls, and a visual repositioning control presenting mode where regions 110 are presented with confluent visual repositioning controls. The availability of the repositioning gestures may therefore be enabled or disabled corresponding to the mode of the device 102. For example, in a visual repositioning control hiding mode, repositioning gestures may be enabled to permit repositioning of the regions 110; but in a visual repositioning control presenting mode, repositioning gestures may be redundant with the visual repositioning controls, and such gestures may therefore be disabled to avoid redundant and possibly accidentally invoked repositioning gestures.

As a third variation of this third aspect, the repositioning gestures may be adjusted in view of the characteristics of the pointer 116 and/or pointing device 114. As one such example, for pointing devices 114 enabling an absolute pointing input mode, it may be advantageous to replace the repositioning gestures provided herein with a different repositioning gesture (e.g., tapping and holding a location corresponding to the location of the region 110 to be repositioned), and therefore to disable the repositioning gestures presented herein. Alternatively, for pointing devices 114 enabling a relative pointing input mode, it may be advantageous to enable repositioning regions 110 with the repositioning gestures presented herein. The repositioning gestures may be adjusted in many ways according to many such variations of the graphical computing environment 106 in furtherance of the techniques presented herein.

E. Exemplary Computing Environment

Figure 7:
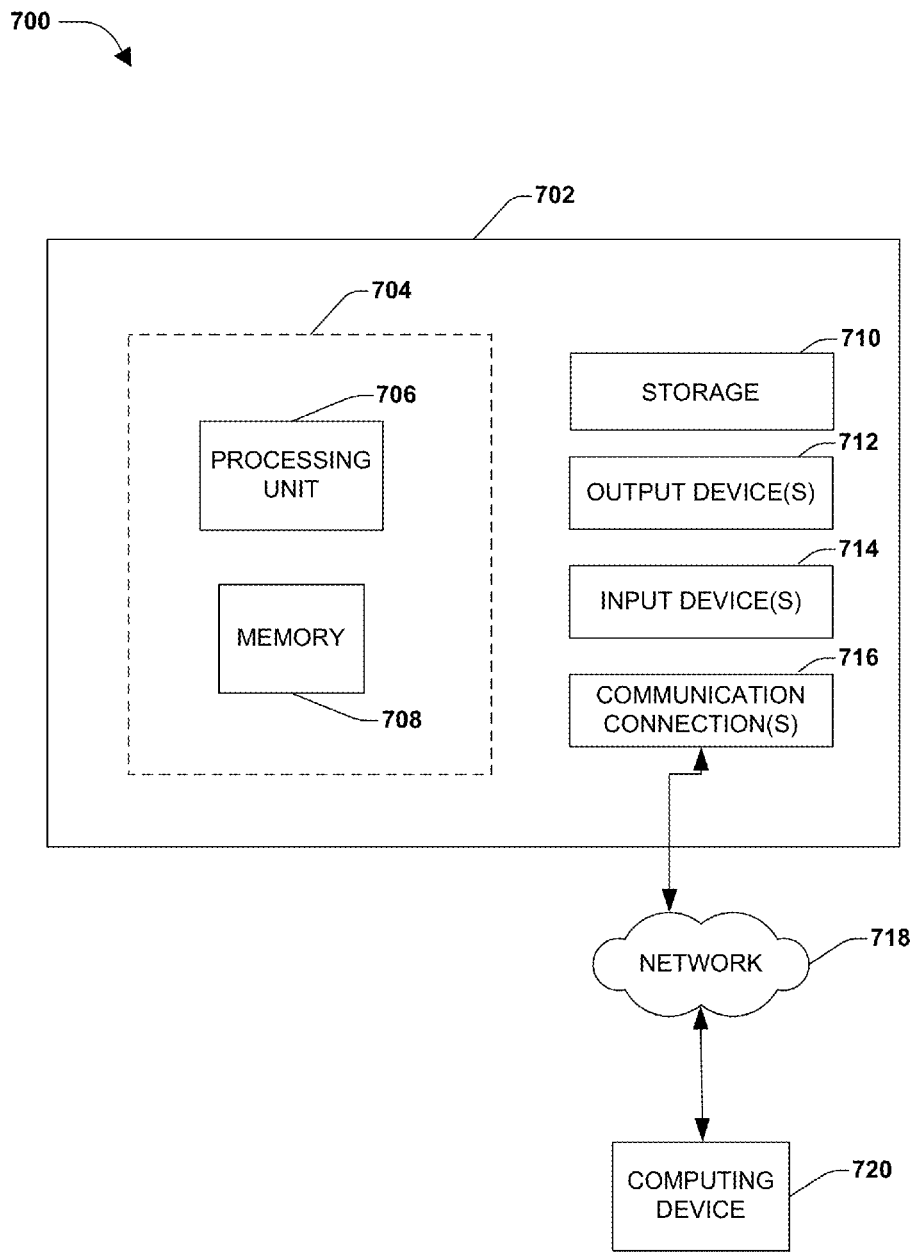
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example) or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In one embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of enabling a user to reposition regions on a device having a processor, a display, and a pointing device associated with a pointer, the method comprising:

executing on the processor instructions configured to:

present respective regions on the display without a visual repositioning control confluent with the region; and while presenting a selected region located near an edge of the display:

upon detecting a hovering of the pointer near the edge of the display for a hover duration, enter a region repositioning suggestion mode that suggests to the user an availability of a region repositioning mode for the selected region; and upon detecting, while in the region repositioning suggestion mode, a movement of the pointer away from the edge of the display, enter a region repositioning mode for the selected region that enables the user to reposition the selected region.

2. The method of claim 1, the instructions further configured to:

present the pointer on the display with a first pointer style; and while in the region repositioning suggestion mode, present the pointer with a second pointer style indicating an availability of the region repositioning mode.

3. The method of claim 1, the instructions configured to, upon entering the region repositioning mode for the selected region:

suggest at least one region relocation suggestion on the display for the selected region; and upon detecting a termination of the region repositioning mode, reposition the selected region at a selected region relocation suggestion.

4. The method of claim 1, entering the region repositioning mode comprising: upon detecting, while in the region repositioning suggestion mode, an activation of the pointer followed by a movement of the pointer away from the edge of the display, enter the region repositioning mode for the selected region.

5. The method of claim 4, the instructions further configured to:
  present the pointer on the display with a first pointer style; and
  while in the region repositioning suggestion mode:
    while not detecting an activation of the pointer, present the pointer with a second pointer style indicating an availability of the region repositioning mode; and
    while detecting an activation of the pointer, present the pointer with a third pointer style indicating an imminent availability of the region repositioning mode.

6. The method of claim 4, the instructions further configured to, upon detecting a deactivation of the pointer while in the region repositioning mode, terminating the region repositioning mode.

7. The method of claim 1, the instructions further configured to, upon entering the region repositioning suggestion mode, refrain from presenting a visual repositioning control other than a pointer style of the pointer.

8. The method of claim 1:
  respective regions associated with an application configured to receive input; and
  the instructions further configured to, upon detecting pointer input from the pointer while in the region repositioning suggestion mode, refrain from sending the pointer input to the application associated with the selected region.

9. The method of claim 1:
  the regions comprising a background region having a region size equal to a display size of the display and presented under other regions; and
  upon entering a region repositioning mode for the background region, enter a background region repositioning mode.

10. The method of claim 9, the background region repositioning mode comprising an all regions repositioning mode.

11. The method of claim 1:
  the regions comprising at least one unrepositionable region for which the region repositioning mode is unavailable; and
  the instructions further configured to refrain from detecting a hovering of the pointer near an edge of the display near an unrepositionable region.

12. The method of claim 1:
  respective regions comprising, while adjacent to an edge of the display, a repositioning area not presented as a visual repositioning control, the repositioning area defined as at least a portion of a lateral edge of the region adjacent to the edge of the display and a repositioning area depth; and
  detecting the hovering of the pointer near the edge of the display comprising: detecting a hovering of the pointer within the repositioning area of the selected region.

13. The method of claim 1, detecting the movement of the pointer away from the edge of the display comprising: detecting a movement of the pointer away from the edge of the display and a distance exceeding a repositioning movement length.

14. The method of claim 13:
  respective edges of the display having a display dimension perpendicular to the edge; and
  the repositioning movement length defined as a percentage of the display dimension perpendicular to the edge.

15. The method of claim 1, the instructions further configured to, upon detecting, while in the region position suggestion mode, input not comprising a movement of the pointer away from the edge of the display during an activation of the pointer, cancel the region repositioning suggestion mode.

16. The method of claim 15:
  respective regions associated with an application configured to receive input; and
  the instructions further configured to, upon canceling the region repositioning suggestion mode, send the input to the application associated with the selected region.

17. The method of claim 1:
  the device defining a visual repositioning control mode selected from a visual repositioning control mode set comprising:
    a visual repositioning control presenting mode, and
    a visual repositioning control hiding mode; and
  entering the region repositioning suggestion mode comprising: upon detecting a hovering of the pointer near the edge of the display for a hover duration while in a visual repositioning control hiding mode, enter the region repositioning suggestion mode.

18. The method of claim 1:
  the pointer associated with a pointing input mode selected from a pointing input mode set comprising:
    an absolute pointing input mode, and
    a relative pointing input mode; and
  entering the region repositioning suggestion mode comprising: upon detecting a hovering of the pointer near the edge of the display for a hover duration while the pointer is associated with a relative pointing input mode, enter the region repositioning suggestion mode.

19. A memory device comprising instructions that, when executed on a processor of a device having a display and a pointing device associated with a pointer, enable a user to reposition regions presented on the display by:
  presenting respective regions on the display without a visual repositioning control confluent with the region; and
  while presenting a selected region located near an edge of the display:
    upon detecting a hovering of the pointer near the edge of the display for a hover duration, entering a region repositioning suggestion mode that suggests to the user an availability of a region repositioning mode for the selected region; and
    upon detecting, while in the region repositioning suggestion mode, a movement of the pointer away from the edge of the display, entering a region repositioning mode for the selected region that enables the user to reposition the selected region.

20. A computer-readable memory device storing instructions that, when executed on a processor of a device having a display and a pointing device associated with a pointer, enable a user to reposition regions on the display by
  presenting respective regions on the display without a visual repositioning control confluent with the region; and
  while presenting a selected region located near an edge of the display:
    upon detecting a hovering of the pointer near the edge of the display for a hover duration, entering a region repositioning suggestion mode that suggests to the user an availability of a region repositioning mode for the selected region; and
    upon detecting, while in the region repositioning suggestion mode, a movement of the pointer away from the edge of the display, entering a region repositioning mode for the selected region that enables the user to reposition the selected region.

* * * * *